United States Patent Office 3,212,846
Patented Oct. 19, 1965

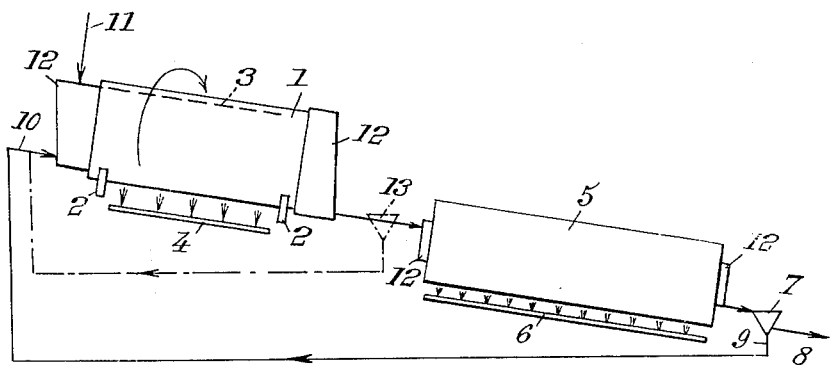

3,212,846
METHOD OF PREPARING URANIC OXIDE IN GRANULATED FORM
Jakub Burko, Paris, Alain Pigeot, Maisons-Laffitte, Claude Jouannaud, Villeneuve-les-Avignon, and Patrick Nollet, La Celle-St. Cloud, France, assignors to Commissariat a l'Energie Atomique, Paris, France, an organization of France
Filed June 4, 1962, Ser. No. 199,983
Claims priority, application France, June 5, 1961, 863,898
7 Claims. (Cl. 23—14.5)

The present invention relates to a method of preparing uranic oxide in granulated form from an aqueous solution of uranyl nitrate or from a paste of ammonium uranate.

The chief object of this invention is to provide a method of this kind which permits of easily obtaining uranic oxide in the form of grains of predetermined size, having both a good porosity and a good mechanical resistance, which qualities condition the efficiency of the subsequent transformations of this oxide.

Our invention consists chiefly in adding to the starting material as above mentioned fine particles of uranic oxide of a grain size smaller than that of the product to be obtained, stirring the whole so as to obtain an intimate mixture and roasting this mixture.

It is known that uranic oxide $UO_3$ constitutes one of the intermediate products in the manufacture of uranium and its compounds from uranium ores. This product is intermediate between the aqueous solution of uranyl nitrate and uranous oxide $UO_2$.

The physical state of this $UO_3$ oxide is important. As a matter of fact, it conditions the efficiency of the subsequent steps of reduction (leading to the obtainment of $UO_2$) and of fluorination (leading to the obtainment of $UF_4$).

Up to now, the $UO_3$ oxide was obtained from the uranium nitrate solution in either of the two following manners:

(a) according to a first method, ammonia was added to this solution, which caused uranium to precipitate in the form of ammonium diuranate. Then the precipitate was separated, dried and roasted, which transformed it into lumps of $UO_3$ oxide which were then crushed before being pressed in the form of pellets;

(b) according to the second method, the nitrate solution was evaporated directly, either in a continuous fashion or not.

The first of these methods permits of obtaining an $UO_3$ oxide having a good reactivity but presents the drawbacks of consuming a substantial amount of ammonia, which is relatively expensive, of requiring voluminous and costly apparatus and of involving the use of an important labour and numerous check-ups.

The second method is simpler but leads to the obtainment of an oxide in the form of particles which are too fine and therefore not well adapted to subsequent treatments.

In order to obviate these drawbacks, our invention consists in mixing with the solution of uranyl nitrate, or to the paste of uranate which results therefrom, fine grains of uranic oxide to obtain an intimate mixture, which is then roasted.

According to a preferred embodiment of the invention these fine grains of uranic oxide result from a recycling of the finest portions of the manufactured product or of the product that is being manufactured, these portions being collected at one or several points of the path of travel of said product.

The method has in particular the following advantages:

The granulated product has a high reactivity due to its good porosity (which results from the gaseous disengagement taking place in the grains as they are being roasted), and to their excellent mechanical strength;

It has a grain size which can easily be adjusted, since it depends essentially upon the grain size of the fine particles mixed to the starting material and upon the conditions in which the mixture is formed;

The preparation of the product may be carried out in a continuous fashion in a simple apparatus (essentially comprising a mixer and a furnace);

This preparation does not require the consumption of any reagent; on the contrary the nitric acid resulting from the thermal decomposition of uranyl nitrate, may be required;

The method is very easy to adjust since the apparatus to be used does not require any modification when the process is modified, for instance by changing the starting material (solution of uranyl nitrate or paste of uranate or mixture of both), by changing the origin, the proportion and/or the grain size of the fine particles of uranic oxyde mixed with the starting material, and so on.

The total amount of fine particles added to the starting material is advantageously such that it contains a weight of uranium ranging from 80 to 300% of the weight of the uranium contained in said starting material, the preferred amount being 200%.

The grain size of said fine particles generally ranges from 0.1 mm. to 1 mm. In order to give these fine particles the desired grain size it may be necessary in some cases to crush them.

The roasting operation may be performed at the same time as the mixing of the fine particles to the starting solution of paste, the mixer being in this case heated to a temperature ranging from 290° to 360° C.

Alternatively the mixture may be performed without heating, the mixture thus obtained being then sent to a furnace where it is roasted.

According to a preferred form of the invention, the mixture is formed at a moderate temperature, ranging from 170 to 250°, which produces grains coated with the starting material which are sufficiently dry to make it possible to sift them. These grains are sifted as they leave the mixer and the biggest particles are sent to the roasting furnace, whereas the finest particles are recycled to the inlet of the mixer.

Several examples, given by way of non-limitative examples, of the present invention, will now be described with reference to the appended drawing, which shows a plant for preparing uranic oxide according to the invention.

In this drawing, reference numeral 1 designates a rotary cylindrical mixing drum journalled on rollers 2, the axis of this drum being slightly oblique to the horizontal. A fixed scraper 3 is mounted in the drum, close to the upper generatrix thereof, so as to scrape the crust adhering to the inner wall of the drum. Heating means 4 are provided under the drum.

A rotating furnace 5 heated through any suitable means, for instance gas heating means 6, is disposed in such manner as to collect the grains issuing from drum 1.

A sieve 7 is provided at the outlet of furnace 5 and has at least two outlets, one 8 for the uranic oxide $UO_3$, in granulated form which constitutes the desired product and the other for the fine particles which are recycled at 10 to the inlet of drum 1.

The drawing further shows the inlet 11 for the solution of paste to be treated, boxes 12 provided with baffles to ensure a relative gas-tightness between the outside and the inside of drum 1 and furnace 5, where the pressure is slightly lower than the outside pressure. A second sieve 13 may be provided between the drum and the furnace.

Example 1

We introduce at 11 into drum 1 an aqueous solution of hexahydrated uranyl nitrate, in the form of an atomized jet or a fine stream, at the rate of 3 kg./h.

We simultaneously introduce at 10, under inlet 11, a powder of uranic oxide of a grain size smaller than 1 mm., at the rate of 2.77 kg./h.

Drum 1, the diameter of which is 30 cms. and the length of which is 65 cms. has its axis inclined at about 5° to the horizontal and it is rotated about this axis at a speed ranging from 20 to 50 revolutions per minute. It is heated at 230° C., which ensures a quick drying of the grains formed therein.

The grain size of the product collected at the outlet of the drum is as follows:

Big grains (diameter greater than 4 mm.): 9.3% by weight;
Intermediate size grains (diameter ranging from 1 to 4 mm.): 42.8%;
Fine grains (diameter smaller than 1 mm.): 47.9%.

This product is sifted at 13. The fine particles that are collected are recycled at 10, and the remainder is fed to furnace 5 heated at 300° C. The inclination and speed of rotation of this furnace are of the same order of magnitude as those of the mixer. Its diameter is 20 cms. and its length about 2 meters.

The grains leaving the furnace have the following composition, by weight:

| | Percent |
|---|---|
| $UO_3$ | 99.7 |
| $N_2O_5$ | 0.15 |
| $OH_2$ | 0.15 |

The distribution of these grains according to their grain size is as follows (by weight):

| | Percent |
|---|---|
| Big grain (more than 4 mm.) | 12.1 |
| Intermediate size grains (from 1 to 4 mm.) | 37.8 |
| Fine grains (less than 1 mm.) | 50.1 |

They are separated by means of sieve 7.

The fine grains collected at 9 at the bottom of this sieve are recycled at 10, whereas the big grains are sent to a crushing machine (not shown) before being also recycled at 10, and the intermediate size grains are collected at 8.

These last mentioned grains have an excellent reactivity due to their porosity and their mechanical strength. Their specific area ranges from 3 to 4 m.²/g., whereas it only averages 0.5 m.²/g. for the grains obtained with the known methods of direct roasting.

It should be noted that the rate of feed above indicated for the $UO_3$ oxide introduced at 10 corresponds to the starting of the operation. After a time the flow rate of recycled oxide ranges from 4 to 4.5 kg./h., the amount of final product collected at 8 ranging approximately from 1 to 1.5 kg./h.

The fine particles introduced at 10 preferably of some sphericity so that they can roll easily upon one another during the mixing, which facilitates a good coating of these particles by the starting material. This is the case of the recycling fine particles.

It is advantageous to separate the mixer from the furnace as above described so as to reduce the risks of formation of a crust on the wall of the furnace. Since this furnace receives only dry product a scraping is necessary only in the mixer.

Example 2

It is similar to Example 1, with the following differences:

The heating temperature of mixer 1, is in this case 180° C., and that of furnace 5, 320° C.;
The initial rate of introduction of the fine particles at 10 is 5.1 kg./h. and that of the nitrate 1.96 kg./h.

The fine particles of a diameter smaller than 1 mm. introduced initially have the following composition:

| | Percent |
|---|---|
| $UO_3$ | 96.3 |
| $N_2O_5$ | 2.2 |
| $OH_2$ | 1.5 |

That of the grains collected at 8 is:

| | Percent |
|---|---|
| $UO_3$ | 99.6 |
| $N_2O_5$ | 0.2 |
| $OH_2$ | 0.2 |

The distribution, according to the grain size, of the product leaving the mixer is:

| | Percent |
|---|---|
| Big grains (more than 4 mm.) | 3.2 |
| Intermediate size grains (from 1 to 4 mm.) | 37.7 |
| Fine grains (less than 1 mm.) | 59.1 |

And that of product leaving the furnace:

| | Percent |
|---|---|
| Big grains | 5 |
| Intermediate grains | 43 |
| Fine grains | 52 |

Example 3

5 kilos of uranic oxide of a grain size smaller than 1 mm. are mixed with 2.75% of a solution of hexahydrated uranyl nitrate in a drum having a vertical axis and provided with stirring blades (of of the type known under the name of Eirich), this drum being not heated.

We obtain 7.665 kg. of grains coated with the uranyl oxide (the difference between this weight and the sum of those of the above mentioned materials representing substantially the amount of nitric acid that has evaporated) which is roasted in a rotatable furnace at 350° C.

The roasted product has the following composition by weight:

| | Percent |
|---|---|
| $UO_3$ | 99.5 |
| $N_2O_5$ | 0.3 |
| $OH_2$ | 0.2 | and the distribution by weight according to the grain size is as follows:

| | Percent |
|---|---|
| Big grains (more than 4 mm.) | 6.15 |
| Intermediate size grains (from 2 to 4 mm.) | 33.7 |
| Intermediate size grains (from 1 to 2 mm.) | 31.85 |
| Fine grains (less than 1 mm.) | 28.3 |

Example 4

2 kgs. of uranic oxide of a grain size smaller than 1 mm. are mixed with 3.5 kg. of a solution of hexahydrated uranyl nitrate in a drum of Eirich type heated at 350° C.

The roasted product has a composition by weight identical to that indicated in Example 3 and it comprises 51% of grain of a grain size greater than 1 mm.

What we claim is:

1. A method of preparing uranic oxide in granulated form from a starting material of the group consisting of concentrated aqueous solutions of uranyl nitrate and ammonium uranate pastes, which method comprises, feeding, at the inlet of a container, both an aqueous solution of said starting material and fine particles of uranium oxide to produce an intimate mixture of said particles and said solution, causing said mixture to travel through said container so as to form a mass of juxtaposed grains consisting of said particles coated with said starting material, and roasting said grains at 290°–350° C.

2. A method according to claim 1 wherein the amount of uranic oxide particles added to said starting material contains a weight of uranium ranging from 80 to 300 percent of the weight of uranium contained in said starting material.

3. A method according to claim 1 wherein the amount of uranic oxide particles added to said starting material contains a weight of uranium equal to about twice the weight of uranium contained in said starting material.

4. A method according to claim 1 wherein the fine particles of uranic oxide added to the starting material have a grain size ranging from 0.1 mm. to 1 mm.

5. A method of preparing uranic oxide in granulated form from a starting material of the group consisting of concentrated aqueous solutions of uranyl nitrate and ammonium uranate pastes, which method comprises, feeding, at the inlet of a container heated at 170°–250° C., both an aqueous solution of said starting material and fine particles of uranium oxide to produce an intimate mixture of said particles and said solution, causing said mixture to travel through said container so as to form a mass of juxtaposed grains consisting of said particles coated with said starting material, and roasting said grains at 290°–350°.

6. A method according to claim 2 which comprises sifting the mixture obtained at the outlet of said mixer, so as to separate the fine particles therefrom, and recycling said particles to mix them with the starting material fed to said mixer.

7. A method according to claim 2 which comprises sifting the mixture obtained at the outlet of said mixer, to collect the fine particles therefrom, sifting the product obtained at the outlet of said furnace to collect the fine particles therefrom, and recycling the whole of said fine particles to the inlet of said mixer to form at least a portion of the fine particles of uranic oxide to be added to said starting material.

References Cited by the Examiner

UNITED STATES PATENTS 2,905,528  9/59  Johnson et al. _____ 23—14.5

OTHER REFERENCES

AEC Document, CF–51–10–133, October 1951, pp. 14 and 15.

CARL D. QUARFORTH, *Primary Examiner.*